United States Patent Office 3,751,400
Patented Aug. 7, 1973

3,751,400
HIGH IGNITION TEMPERATURE POLYMERS SUBSTITUTED WITH HALOGEN SUBSTITUTED AROMATIC GROUPS
Timothy P. Crennan, Lenox, Mass., and Donald B. G. Jaquiss, New Harmony, Ind., assignors to General Electric Company
No Drawing. Continuation-in-part of application Ser. No. 28,180, Apr. 13, 1970, which is a continuation of application Ser. No. 532,870, Mar. 9, 1966, both now abandoned. This application July 29, 1971, Ser. No. 167,484
Int. Cl. C08g 17/13, 51/58
U.S. Cl. 260—47 XA  8 Claims

ABSTRACT OF THE DISCLOSURE

High ignition temperature aromatic carbonate polymers derived from dihydric phenols containing terminal bromine substituted aromatic group and contain 3–5 halogen atoms. The polymers are prepared by reacting bisphenol-A, phosgene and pentabromophenol, for example.

---

This application is a continuation-in-part of U.S. patent application Ser. No. 28,180, filed Apr. 13, 1970, now abandoned which is in turn a continuation of Ser. No. 532,870, filed Mar. 9, 1966, now abandoned.

This invention is directed to novel polymers and in particular to novel high ignition temperature condensation polymers which have excellent flame resistance and wherein the novel condensation polymers contain terminal halogen-substituted aromatic groups.

Flame resistant polymer compositions are well known in the art and generally consist of a polymer having in admixture therewith a compound which imparts flame retardance to the total polymer composition. Such compositions, while having excellent flame resistance, have certain drawbacks. For example, in order to achieve good flame resistance with certain of the additives, exceedingly large amounts of the additive are necessary. This unfortunately can result in the deficiency of other desirable properties such as tensile strength, impact resistance, etc. On the other hand, to maintain the desirable properties by employing smaller amounts of the additive results in poor flame resistance. In addition, other additives, when so employed with a polymer to achieve a flame-resistant polymer composition, will tend to migrate or deteriorate during the fabrication of the polymer composition and thereby result in a fabricated article having little or no flame resistance.

In addition to the above, such additives serve only the one function of imparting flame resistance. To achieve any other end result, other additives are necessary. For example, the controlling of the molecular weight of a polymer is exceedingly important, but would require the addition of another component part to achieve a controlled molecular weight of the polymer.

It has now been surprisingly discovered that a particular material which when added to a process for preparing a polymer reacts with the polymer to provide novel condensation polymers having controlled molecular weight and excellent flame resistance.

Therefore, it is an object of this invention to provide novel high ignition temperature condensation polymers.

Another object of this invention is to provide flame-resistant high ignition temperature condensation polymers.

Still another object of this invention is to provide high ignition temperature condensation polymers of controlled molecular weight.

Further, another object of this invention is to provide a process for preparing novel high ignition temperature condensation polymers of controlled molecular weight.

These and other objects and advantages of this invention will become apparent from the following detailed description thereof.

Briefly, according to this invention, the novel high ignition temperature condensation polymers are prepared by carrying out particular polymer reactions in the presence of a monofunctional halogen-substituted aromatic compound. The polymers so produced are terminated with halogen-substituted aromatic groups, are resistant to flaming and are of controlled molecular weight.

The following examples are set forth to illustrate more clearly the plan and practice of this invention to those skilled in the art. Unless otherwise specified, where parts or percentages are mentioned, they are parts or percentages by weight.

EXAMPLE I

This example is directed to the preparation of an aromatic carbonate condensation polymer having pentabromophenyl terminal groups.

To 280 ml. of methylene chloride, containing 150 microliters of pyridine, in a reaction flask fitted with a reflux condenser and a stirrer, 3.0 grams of pentabromophenol, 47.0 grams of bisphenol-A and 54.4 grams of finely divided calcium hydroxide are added under vigorous agitation. While under vigorous agitation, the suspended reactants are treated with gaseous phosgene initially at the rate of about 1.0 gram of phosgene per minute and then finally at the rate of 0.2 gram per minute under reflux conditions. Additional methylene chloride is then added to the reaction flask. The polymer solution obtained is water-white and perfectly clear upon centrifuging. The polymer is then recovered by precipitation in methanol and dried overnight at 125° C. The polymer has an intrinsic viscosity of 0.53 deciliter per gram in dioxane at 30.0° C. The bromine content of the polymer is 4.2 weight percent based on the weight of the polymer.

EXAMPLE II

Example I is repeated except that 2.5 grams of pentabromophenol are employed herein in place of the 3.0 grams of Example I. The resulting polymer has an intrinsic viscosity of 0.56 deciliter per gram in dioxane at 30.0° C. and a bromine content of 3.3 weight percent based on the weight of the polymer.

EXAMPLE III

The resin so prepared in Examples I and II is pressed into sheets of 40 mils thickness at 220° C. and 1500 p.s.i.g. The sheets are cut into bars 6" long by ½" wide and tested for flammability by employing a modified version of Underwriters' Laboratories Bulletin 94 test. In the modified test, the test specimens are mounted with the longest dimension thereof vertical with the lower end about ⅜ of an inch above the top of a Bunsen burner. The Bunsen burner is ignited to produce a ¾" blue flame which is then placed under the specimen for a period of 10 seconds. The Bunsen burner is removed and the duration of combustion of the specimen is noted. If the duration of combustion is less than 30 seconds, the Bunsen burner is again placed under the sample for 10 seconds. The time of flame-out is again noted. If any dripping or flaming particles occur, the particles are allowed to fall on surgical cotton to determine the ability of the flaming particles to ignite the surgical cotton. As a control, a straight polycarbonate resin is employed which is prepared by the phosgenation of bisphenol-A. The results obtained are the average of five test samples and are as follows:

TABLE I

| Sample | Seconds | | Cotton ignition |
|---|---|---|---|
| | First ignition | Second ignition | |
| Example I | 2.6 | 2.8 | No. |
| Example II | 3.0 | 3.3 | No. |
| Control | 20.0 | 17.0 | Yes. |

EXAMPLE IV

The resin of Example I is injection molded into small test bars employing a 2½-ounce Van Dorn press at a temperature of about 255° C. The molded samples are tested for flammability employing the same test conditions as described in Example III. The results obtained with an injection molded test specimen are the same as the results obtained in Example III.

The instant invention is directed to high ignition temperature condensation aromatic carbonate polymer having terminal bromine substituted aromatic groups, wherein the polymers have a controlled molecular weight of about 1,000 to 100,000 number average molecular weight. By "high ignition temperature polymers," it is meant thermoplastic polymers having an ignition temperature above 700° F. Ignition temperature means that temperature at which the thermoplastic polymer will ignite as determined by Setchkin's ignition test. The complete description and procedure is given in ASTM D-1929–62T, and is incorporated herein by reference. The polymer of this invention is prepared by carrying out the condensation reaction for preparing the high ignition temperature polymer in the presence of a monofunctional bromine-substituted aromatic compound of the following formula:

wherein A is an aromatic radical, R can be either hydrogen, an alkali metal such as sodium, potassium, lithium, etc., an earth alkali metal such as magnesium, calcium, barium, etc. or a chlorocarbonyl radical COCl—. In the above formula, X is bromine, and $n$ is an integer of 3–5. Examples of some of the bromine substituted aromatic compounds which can be employed in place of the pentabromophenol used in the examples are sodium pentabromophenate, calcium pentabromophenate, potassium pentabromophenate, pentabromophenylchloroformate, tetrabromophenylchloroformate, tribromophenol, sodium tribromophenate, calcium tribromophenate and 1,3,4,6-tetrabromo 2-naphthol. The results obtained are essentially the same as in the examples.

In addition, the bromine-substituted aromatic compounds of this invention are also useful in controlling the molecular weight of the high ignition temperature polymer. The number average molecular weight of the polymer can be controlled between 1,000–100,000 depending upon the amount of the molecular weight regulator employed. The amount employed in the practice of this invention is 0.1–50.00 weight percent based on the total weight of the polymer and preferably 1.0–35.0 weight percent, again, depending upon the end use properties desired.

It is surpringly noted that the bromine-substituted aromatic compounds are excellent molecular weight regulators and provide the novel high ignition temperature condensation polymer having excellent flame resistance. The fact that the bromine substituted aromatic compounds are incorporated into the high ignition temperature polymer is surprising since bromine-substituted aromatic compounds are more acidic than unsubstituted phenols and are therefore more reactive. As such, one skilled in the art would, therefore, expect that the bromine-substituted aromatic compounds would react with themselves. Instead it was surprisingly discovered that they reacted with the polymer to form the novel condensation polymer herein described terminated with bromine-substituted aromatic groups and wherein the polymer is of controlled molecular weight and has excellent flame resistance.

In the practice of this invention, the high ignition temperature polymer employed to prepare the novel conerably phosgene is employed to prepare the aromatic carbonate polymer. The aromatic carbonate polymers employed in the practice of this invention are carbonate homopolymers of dihydric phenols, carbonate copolymers of two different dihydric phenols or copolymers of such dihydric phenols with glycols, e.g., ethylene glycol or propylene glycol, dibasic acids, e.g., isophthalic acid or terephthalic acid, or hydroxyl or acid-terminated polyesters, e.g., hydroxyl or acid-terminated polyesters of neopentyl glycol and adipic acid and include those disclosed in U.S. Pats. 3,030,331 and 3,169,121 which are hereby incorporated by reference. Such aromatic carbonate polymers are prepared by reacting a dihydric phenol with a carbonate precursor which may be either a carbonyl halide, e.g., as carbonyl chloride, carbonyl bromide and carbonyl fluoride or a haloformate, e.g., bishaloformates of dihydroxy aromatic compounds (bischloroformates of hydroquinone, etc.) or glycols (bishaloformates of ethylene glycol, neopentyl glycol, propylene glycol etc.). Preferaby phosgene is employed to prepare the aromatic carbonate polymers employed in the practice of this invention.

In general, the dihydric phenols which can be employed in place of the bisphenol-A used in the examples to prepare the aromatic carbonate polymers are mononuclear or polynuclear aromatic compounds, containing as functional groups, two hydroxyl radicals, each of which is attached directly to a carbon atom of an aromatic nucleus and are hydroquinone, resorcinol, bis(4-hydroxyphenyl) methane, 2,2-bis(4-hydroxy-3-methylphenyl) propane, 4,4-bis(4-hydroxyphenyl)heptane, 2,2-(3,3',5,5'-tetrachloro-4,4'-dihydroxy-diphenyl) propane, 2,2-(3,3',5,5'-tetrabromo-4,4'-dihydroxy-diphenyl) propane and 3,3'-dichloro-4,4'-dihydroxydiphenyl methane. Other dihydric phenols are also available and are disclosed in U.S. Pats. 2,999,835, 3,028,365 and 3,334,154 which are incorporated herein by reference. As stated previously, it is, of course, possible to employ two or more different dihydric phenols or a copolymer of a dihydric phenol with a glycol, a hydroxy or an acid-terminated polyester, or a dibasic acid in the event a carbonate copolymer rather than a homopolymer is desired for use in the preparation of the novel aromatic carbonate polymers of this invention.

The method for preparing the aromatic carbonate polymers of this invention, when employing phosgene, involves passing phosgene into a reaction mixture containing a dihydric phenol, for example, an acid acceptor such as a tertiary amine and a halogen-substituted aromatic compound such as pentabromophenol. The acid acceptor may be used undiluted or diluted with inert organic solvents as, for example, methylene chloride, chlorobenzene, or 1,2 dichloroethane. Tertiary amines are advantageous since they are good solvents as well as acid acceptors during the reaction.

The temperature at which the phosgenation reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the flame-resistant polycarbonate resin mixtures of the invention comprises adding phosgene to an alkaline aqueous solution of the dihydroxy aromatic compound used. This is preferably done in the presence of inert solvents such as methylene chloride, 1,2 dichloroethane and the like. Quaternary ammonium compounds or tertiary amines may be employed to catalyze the reaction.

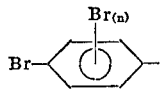

Still another method for preparing such carbonate polymers involves the phosgenation of an agitated suspension of an alkaline earth metal hydroxide and a dihydric phenol used in a non-aqueous medium such as chlorobenzene, methylene chloride, ethylene dichloride, etc. This reaction is illustrated by the addition of phosgene to a slurry of calcium hydroxide and 2,2 bis-(4-hydroxyphenyl)-propane in an inert polymer solvent such as chlorobenzene. The organic solvent should preferably be a polymer solvent but need not necessarily be a good solvent for the reactants.

As stated previously, the process of this invention is one wherein the condensation polymer reaction is carried out in the presence of a mono-functional bromine-substituted aromatic compound of the formula:

wherein A is an aromatic radical, R is selected from the group consisting of either hydrogen, alkali metal, earth alkali metal or the chlorocarbonyl radical COCl—. In the above formula X is bromine, and $n$ is an integer of 3–5. The process for carrying out the condensation polymer reaction is as set forth above in the description of the particular aromatic carbonate polymer. Generally, in the practice of this invention, it is preferred to prepare a carbonate polymer employing pentabromophenol as a molecular weight regulator. Also, as indicated previously, the condensation reaction is carried out in the presence of 0.1–50.0 weight percent of the molecular weight regulator based on the total weight of the polymer.

Typically, the polymer of this invention may be represented by the following formula:

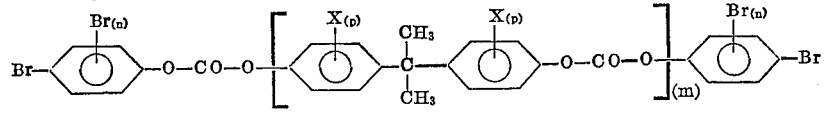

In the above, formula, $n$ is an integer of 2–4; X can be either halogen, alkyl or aryl; $p$ is an integer of from 0 to 4 and $m$ is an integer of from 2 to about 400.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What is claimed is:

1. A thermoplastic high ignition temperature condensatic aromatic carbonate polymer of average molecular weight of 1,000–100,000 derived from dihydric phenols and containing terminal bromine-substituted aromatic radicals, said aromatic carbonate polymer represented by the following formula:

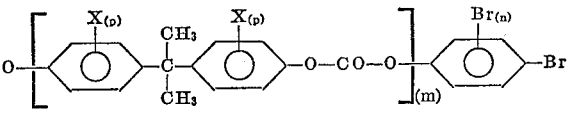

wherein $n$ is an integer of 2–4; X can be either halogen, alkyl or aryl; $p$ is an integer of from 0 to 4 and $m$ is an integer of from 2 to about 400.

2. The composition of claim 1 wherein the aromatic carbonate polymer is a polymer of a dihydric phenol and a carbonate precursor.

3. The composition of claim 1 wherein the aromatic carbonate polymer is a polymer of bisphenol-A and the carbonate precursor is phosgene.

4. The composition of claim 1 wherein the bromine-substituted aromatic group is a tribromophenyl group.

5. The composition of claim 1 wherein the bromine-substituted aromatic group is a pentabromophenyl group.

6. In a process for preparing a thermoplastic high ignition temperature condensation aromatic carbonate polymer having terminal bromine-substituted aromatic groups and controlled average molecular weight of 1,000–100,000, the improvement which consists of carrying out the condensation reaction in the presence of 0.1–50.0 weight percent based on the total weight of the polymer of a molecular weight regulator of the following formula:

wherein A is an aromatic radical, R is selected from the group consisting of hydrogen, alkali metal, earth alkali metal and a chlorocarbonyl radical COCl—, X is bromine and $n$ is an integer of 3–5.

7. The process of claim 6 wherein the molecular weight regulator is pentabromophenol.

8. The process of claim 6 wherein the aromatic carbonate polymer is prepared by reacting bisphenol-A with phosgene.

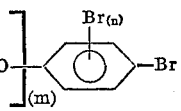

References Cited
UNITED STATES PATENTS

| | | | |
|---|---|---|---|
| 3,409,704 | 11/1968 | Bailey | 260—47 |
| 3,334,154 | 8/1967 | Kim | 260—47 |
| 3,062,781 | 11/1962 | Bottenbruch et al. | 260—47 |

JOHN C. BLEUTGE, Primary Examiner
W. J. BRIGGS, SR., Assistant Examiner

U.S. Cl. X.R.
260—45.95, DIG. 24; 77.5 D